Patented Sept. 6, 1949

2,481,449

UNITED STATES PATENT OFFICE 2,481,449

VAT DYESTUFF DERIVED FROM AMINODIBENZANTHRONE

Wilhelm Schmidt-Nickels, Little York, N. J., assignor to General Aniline & Film Corporation, New York, N. Y., a corporation of Delaware No Drawing. Application October 7, 1947, Serial No. 778,463

2 Claims. (Cl. 260—354)

This invention relates to new valuable vat dyestuffs of the dibenzanthrone series, their leuco sulfuric acid esters and a process of producing the same.

It has been found that new and valuable vat dyestuffs of the dibenzanthrone series from which blue-gray dyes of excellent fastness to chlorine, light and washing are produced, can be prepared by reacting amino-dibenzanthrones with 1-chloro-2,4-dinitrobenzene in substantial excess at a temperature above 220° C. While it has heretofore been proposed to react an amino-dibenzanthrone with chlorinated nitrobenzene, such as picryl chloride, using nitrobenzene as a solvent for the reaction (see, for example, U. S. Patent No. 1,967,363 to Kunz et al.), the dyestuffs obtained by such prior art processes show very poor chlorine fastness. It has now been found that by using 1-chloro-2,4-dinitrobenzene as a reagent and in a sufficient amount that it functions at the same time as a solvent for the reaction, and furthermore raising the temperature above 220° C., dyestuffs are obtained which show excellent fastness to chlorine, light and washing. These new dyestuffs may be employed as vat dyestuffs for dyeing or printing, or they may be converted into their leuco sulfuric acid ester salts by the methods employed for the solubilization of dibenzanthrone dyestuffs and used for dyeing fiber in that form.

Any amino-dibenzanthrone containing one or more amino groups may be employed, the shade of the ultimate dyestuff varying to some extent, depending on the particular amino-dibenzanthrone employed.

The present invention will be fully understood by those skilled in the art by consideration of the following example, which is given to illustrate the same; the parts used are by weight.

Example 200 parts of 1-chloro-2,4-dinitrobenzene are heated to 200° C., at which temperature 20 parts of amino-dibenzanthrone are stirred into the liquid. After the charging is completed, the mass is stirred at 230–240° C. for 5 hours. It is then allowed to cool to 100° C. At this temperature, 200 parts of benzene are added, the mixture is filtered and the cake is washed with benzene and finally dried. The crude product is redissolved from concentrated sulfuric acid at 10° C. The solution in sulfuric acid is poured into ice water. The dyestuff separates. After filtration, it is washed neutral and dried. Cotton is dyed from a blue vat in bluish-gray shades of excellent fastness to chlorine, light and washing.

For the preparation of the leuco sulfuric acid ester of the dyestuff, 200 parts of dry pyridine are cooled to keep the temperature below 60° C., while 35 parts of chlorosulfonic acid are dropped into it. At 48° C. the other reaction components are charged in the following order: 23.6 parts of the new gray vat dyestuff, prepared as described in the preceding paragraph, 8.4 parts of iron powder obtained by reduction with hydrogen, and 0.2 part cuprous chloride. The reaction starts after a few minutes, causing the temperature to rise. Cooling is applied to keep the temperature from rising above 50° C. When the temperature begins to fall, a heating bath is used to keep the charge at 48–50° C. for 4 hours while agitating. Then the reaction product is poured into a solution of 375 parts water and 64 parts soda ash. Rinsing water can be used freely. The pyridine is removed by distillation under diminished pressure. After completion of the distillation, the mixture is filtered, the cake being washed with hot water to remove the sulfuric acid ester sodium salt of the leuco dyestuff completely from the iron sludge. The solution, including the washings, is heated to 75° C., at which temperature 15 parts sodium chloride per 100 parts of solution are added under stirring. Then the product is allowed to cool without agitation. After filtration, the cake is dried in vacuum at room temperature. The product represents the sulfuric acid ester sodium salt of the leuco form of the new gray vat dyestuff. The product is easily soluble in water with brownish-red color. Dyeings with this solution or prints with the new compound are developed with acidic oxidizing agents, such as dilute sulfuric acid and bichromate solution, to give a very fast bluish-gray to black, depending on the amount of dyestuff used.

This application is a continuation-in-part of copending application Serial No. 624,582, filed October 25, 1945, now abandoned.

I claim:

1. A vat dyestuff which dyes cotton from a blue vat in bluish-gray shades fast to chlorine and which is obtained by heating to a temperature above 220° C. a solution of aminodibenzanthrone in a substantial excess of 1-chloro-2,4-dinitrobenzene.

2. A leuco ester of the vat dyestuff defined in claim 1.

WILHELM SCHMIDT-NICKELS.

REFERENCES CITED

The following references are of record in the file of this patent:

UNITED STATES PATENTS

| Number | Name | Date |
|---|---|---|
| 1,967,363 | Kunz et al. | July 24, 1934 |

FOREIGN PATENTS

| Number | Country | Date |
|---|---|---|
| 530,146 | Germany | July 22, 1931 |